No. 770,204. Patented September 13, 1904.

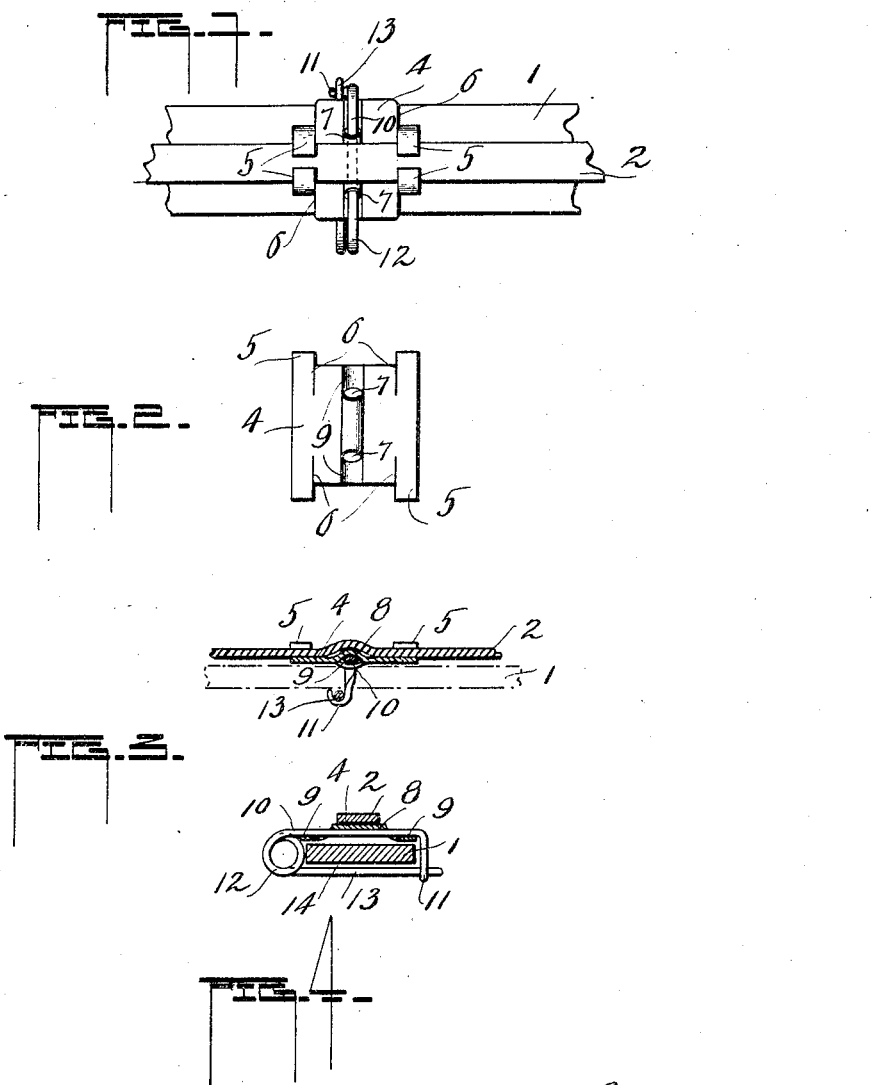

UNITED STATES PATENT OFFICE.

JACOB WAMBSGANS, OF PEORIA, ILLINOIS, ASSIGNOR OF ONE-HALF TO CHARLES C. HECHT, OF PEORIA, ILLINOIS.

FLY-NET HOLDER.

SPECIFICATION forming part of Letters Patent No. 770,204, dated September 13, 1904.

Application filed August 21, 1902. Serial No. 120,595. (No model.)

*To all whom it may concern:*

Be it known that I, JACOB WAMBSGANS, a citizen of the United States, residing at Peoria, in the county of Peoria and State of Illinois, have invented certain new and useful Improvements in Fly-Net Holders; and I do hereby declare that the following is a full, clear, and exact description of the invention, which will enable others skilled in the art to which it appertains to make and use the same.

This invention has reference to that class of devices or clasps for holding fly-nets in proper position on the rump of an animal; and the object which I have in view is to provide a holder in this class which may be securely clamped to the back-strap of a fly-net and having means for detachably connecting the said holder to the back-strap of a harness and in such fashion that any movement of the animal that would tend to pull the net the holder will accommodate itself to such movement by sliding on the back-strap of the harness.

The device will be more fully understood by reference to the following specification and to the accompanying drawings, forming a part thereof, in which—

Figure 1 is a plan view illustrating the holder in its proper relation holding the fly-net to the back-strap of a harness. Fig. 2 is a plan in outline of the main plate of the holder. Fig. 3 is a longitudinal section of the same. Fig. 4 is a transverse cross-section.

In the figures, 1 indicates the back-strap of a harness, and 2 designates the back-strap of a fly-net, only sufficient back-strap of the harness and fly-net being shown to illustrate the application of the device.

4 designates a plate, metallic or otherwise, but preferably metallic, formed with the clips 5 from its four corners by short incisions made in the plate at 6, the plate when first formed showing the clips extending slightly beyond the edges of the plate for a purpose described. The body of the plate is shown perforated at 7 7 and depressed from one side to form a channel, as at 8, intermediate the perforations and depressed upon the opposite side of the plate to form the channel 9 from the perforations to the outer edges of the plate, as shown, and 10 refers to a pin, in form similar to an ordinary safety-pin, having the body portion passing through the perforations 7 7 and lying in the channels 8 and 9, as shown, with the loop 11, the coil portion 12, and the pin portion 13 for engagement with the loop 11 and when so engaged leaving the channel 14 between the lower face of the plate and the pin, as shown.

In attaching the holder to the back-strap of a fly-net the holder is placed in a position with the pin portion depending, as seen in Fig. 4, and with the clips 5 bent back upon the back-strap of the fly-net, which extends across the top face of the holder, and the clips are pressed down to retain the back-strap of the fly-net in an immovable position relative to the holder. In this manner the holder is always attached to the net on or off the animal. When placing the net on an animal, the pin 13 is released from the loop 11, clasped around the back-strap of the harness, so as to loosely encircle the same in the manner shown in the figures, and then again caused to engage the loop 11, thus retaining the strap in the inclosure formed by the pin. It is readily apparent that the holder will freely slide back and forth on the back-strap of the harness and maintain the fly-net in its proper position on the animal irrespective of the play of the harness.

I am aware that various changes may be made in the construction of the plate and the arrangement of the plate and pin and that details may be resorted to without affecting the principle of invention herein.

Having thus fully described my invention, what I claim, and desire to secure by Letters Patent of the United States, is—

In a device of the character set forth, a fly-net holder comprising a plate having a body formed with a central transverse channel therein, a portion of the metal of the plate being stamped rearwardly and forwardly perforations being thereby formed in the plate, integral projections extending beyond the body at each corner thereof and being cut therefrom to a distance within the body, adapted to be bent into arrangement with a portion of the harness, and a clasp adapted to pass through the perforations of the body and seat within the channel, substantially as and for the purpose set forth.

In testimony whereof I affix my signature in presence of two witnesses.

JACOB WAMBSGANS.

Witnesses:
    CHAS. W. LA PORTE,
    ROBERT N. McCORMICK.